Nov. 17, 1959     L. LOUIK ET AL     2,913,080
LUGGAGE HANDLES
Filed June 30, 1958
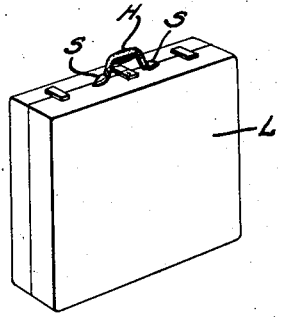
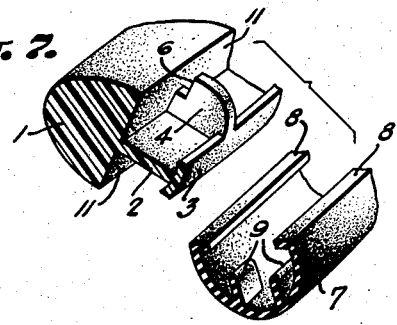
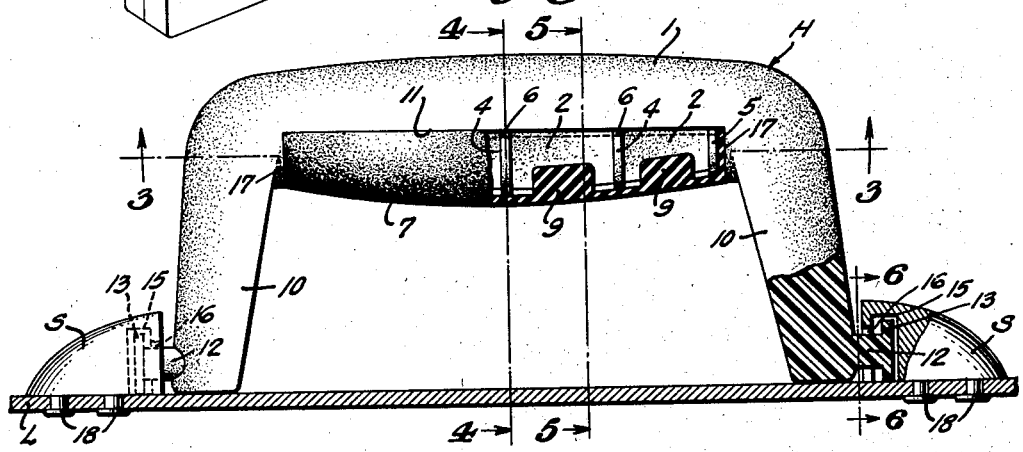
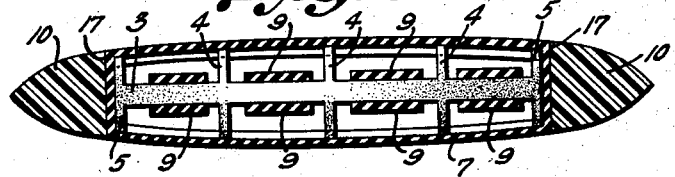
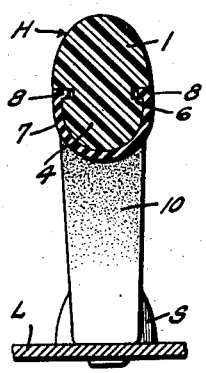
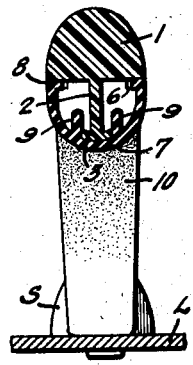
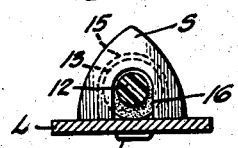
INVENTORS
LEONARD LOUIK
LOU F. MARKS
BY
ATTORNEY United States Patent Office 2,913,080
Patented Nov. 17, 1959

2,913,080

LUGGAGE HANDLES

Leonard Louik and Lou F. Marks, Pittsburgh, Pa., assignors to Bruce Molded Plastics, Inc., Pittsburgh, Pa., a corporation of Pennsylvania Application June 30, 1958, Serial No. 745,505

6 Claims. (Cl. 190—57)

This invention relates to a luggage handle and more particularly to a handle formed of molded plastic material.

It is the object of the present invention to provide a composite luggage handle of molded plastic material which is strong and resistant to wear, which is economical to fabricate, and which is extremely comfortable in use.

It is another object of the invention to provide the main component of a luggage handle which may be molded of hard plastic material in a single operation, being formed in a single molding operation with the sides of the handle and the horizontal bridging member therebetween, as well as with end mounting pins or trunnions projecting from the sides of the handle for pivotally mounting the handle on retaining studs adapted to be affixed to the luggage unit. The auxiliary component of the luggage handle may likewise be molded of softer plastic material in a single operation. While the cross-sectional outline of the handle may be varied within limits and at different portions thereof, the main component assumes a semi-cylindrical or semi-ellipsoidal cross-section and the bottom face of the bridging member is flat in order to accommodate smoothly the top edges of the auxiliary component of softer plastic material to form a comfortable hand-hold for the luggage unit.

It is a further object of the invention to provide a two-part luggage handle which may be easily assembled and dis-assembled.

The invention proceeds upon the principle of molding integrally a luggage handle formed of two sides with a horizontal bridging member extending between the top of the sides and with cylindrical pintles or trunnions extending outwardly from the outer faces of the opposite ends of the sides, for mounting within stud receptacles affixed to the luggage unit. The bridging member is formed with a flat under-face having a flange extending downwardly from said face along the longitudinal axis of the bridging member. This flange is preferably provided with reinforcing webs extending transversely from the opposite sides thereof at longitudinally displaced points therealong, including the extremities of the flange. A sheath of soft molded rubber or other soft plastic is adapted to encompass the flange and merge with the outer contours of the upper portion of the bridging member to afford a comfortable hand-hold for the luggage unit. The sheath may be formed of softer rubber or plastic of the same or different color from that of the main body of the handle to obtain desired ornamental effects. By providing notches in the re-inforcing webs adjacent to the flat face of the bridging member, sockets may be formed for inwardly directed fillets formed on the sheath member to enhance the resilient gripping engagement of the sheath with the lower portion of the handle and the retaining flange extending therefrom. Furthermore, the flange may be formed with a footed base or beading to reinforce the integrally molded flange and reinforcing webs, and the sheath may be formed with upstanding stabilizing ribs extending adjacent to the edges of the beading between the reinforcing webs to impart strength and stability to the assembly without affecting adversely the yielding character thereof. Preferably, the sheath diminishes in its transverse cross-section from its mid-portion towards its ends, complementally to the varying cross-section of the solid bridging member of the handle to enhance the comfort of the hand-grip of the composite handle unit.

Other objects and purposes will appear from the detailed description of the invention following hereinafter, taken in conjunction with the accompanying drawings wherein Fig. 1 is a perspective view of a piece of luggage embodying the handle in accordance with the invention;

Fig. 2 is a front elevation with certain parts in section of the molded plastic handle in accordance with the present invention;

Fig. 3 is a horizontal sectional view along line 3—3 of Fig. 2;

Fig. 4 is a vertical sectional view along line 4—4 of Fig. 2;

Fig. 5 is a vertical sectional view along line 5—5 of Fig. 2;

Fig. 6 is a vertical sectional view along line 6—6 of Fig. 2; and

Fig. 7 is an exploded view of portions of the handle and sheath in disengaged position.

As shown in the drawings, the luggage unit L is adapted to have mounted thereon the molded handle H by the pivotal mounting of integral outwardly extending trunnions of the handle within mounting studs S affixed to the luggage unit by rivets or other suitable fasteners.

In Fig. 2 is shown the handle formed of two sides 10 joined together by a top bridging member 1 having a flat underface 11 and provided with integral cylindrical pintles or trunnions 12 extending outwardly from each of the sides 10. The pintles are provided with enlarged circular heads 13 which are adapted to be accommodated in sockets 15 communicating with the ends of the studs S by way of passages 16. The studs with the headed trunnions seated therein may be affixed to the body of the luggage unit L by means of rivets 18 which may form integral parts of the studs and which are upset after the rivets are seated within suitable openings in the luggage unit L.

As shown in Figs. 4 and 5, the handle portion 1 is formed of generally semi-circular or semi-ellipsoidal configuration and a flange 2 is formed integrally with this handle portion 1 and extends downwardly from the lower face 11 and medially thereof along the bottom thereof. The lower end of the flange is reinforced by a bead or molding 3 extending transversely from the opposite faces thereof and preferably along a curved line having a maximum height at the middle of the handle and diminishing towards each end thereof. Transverse reinforcing webs 4, formed integrally with the handle portion 1, flange 2 and molding 3, are provided at the mid-point of the handle as well as at points longitudinally displaced therefrom, including end webs 5 at the end of the flange 2, which webs are slightly displaced from the inner walls of the sides 10.

The transverse webs 4 and 5 are provided with notches 6 on opposite sides thereof adjacent to the flat face 11 of the main handle portion 1, and these notches are designed to receive the inwardly extending fillets 8 of the flexible sheath 7 which is adapted to encompass the flange 2, bead 3 and reinforcing webs 4 and 5. The fillets 8 serve to key in the sheath so that when the sheath is sprung over the reinforcing webs, the fillets first spread as they pass over the wide portions of the webs and spring into place in the notches 6 to help maintain an integrated connection between the parts, as well as to impart a finished appearance to the composite unit.

Upstanding ribs 9 are also molded integrally on the interior of the sheath which are spaced apart at the bottom thereof corresponding to the spacing of the edges of the bead 3, and are provided at displaced points along the length of the sheath so that these ribs may closely embrace the opposite edges of the bead 3 between the reinforcing webs 4 and 5, thereby to enhance the stability of the handle without affecting its yieldability and therefore its comfort to the hand when the same grasps the bottom of the handle.

The sheath 7 may be molded of rubber or any other plastic material which is softer than the molded plastic forming the main component of the handle, and is of generally semi-cylindrical cross-section which decreases in size from the center towards the ends to complement the curvature of the upper portion of the handle 1. The ends 17 of the sheath are accommodated to the exterior of the end reinforcing webs 5 and between these webs 5 and the inner walls of the sides 10 of the handle.

The sheath 7 is molded separately from the rest of the handle and may be formed of rubber or other soft plastic material of the same color as the handle or of contrasting color, which may be interchanged with the main body of the handle at different times and on different luggage units, to obtain desired ornamental effects.

While we have described our invention as embodied in a specific form and as operating in a specific manner for purpose of illustration, it should be understood that we do not limit our invention thereto, since various modifications will suggest themselves to those skilled in the art without departing from the spirit of our invention, the scope of which is set forth in the annexed claims.

We claim:

1. A luggage handle comprising an integral body of hard molded plastic material having a pair of sides and a top bridging member extending therebetween, said member comprising a solid upper portion and an integral flange extending downwardly along the longitudinal axis of said portion, and a sheathing element of softer plastic material than said body having inwardly biased sides for resiliently embracing the opposite sides of said flange, said sheathing element having an external contour complemental to the outer surface of said upper portion to provide a comfortable hand-hold for the luggage handle.

2. A luggage handle comprising an integral body of hard molded plastic material having a pair of solid sides and a top bridging member extending therebetween, said member comprising a solid upper portion of substantially semi-cylindrical cross-section, and an integral flange extending downwardly along the longitudinal axis of said portion, a sheathing element of softer plastic material than said body having inwardly biased sides for resiliently embracing the opposite sides of said flange, said sheathing element having an external contour complemental to the outer surface of said upper portion to provide a comfortable hand-hold for the luggage handle, and molded plastic cylindrical trunnions integral with and extending outwardly from said sides at the ends thereof remote from said bridging member.

3. A luggage handle comprising an integral body of hard molded plastic material having a pair of sides and a top bridging member extending therebetween, said member comprising a solid upper portion with a plane bottom face and an integral flange extending downwardly from said face along the longitudinal axis of said portion, a plurality of reinforcing webs extending transversely from said flange at longitudinally displaced points therealong, and a sheath of softer plastic material than said body having inwardly biased sides for resiliently embracing the opposite sides of said flange and the edges of said webs, said sheath having an external contour complemental to the outer surface of said upper portion to provide a comfortable hand-hold for the luggage handle.

4. A luggage handle comprising an integral body of hard molded plastic material having a pair of sides and a top bridging member extending therebetween, said member comprising a solid upper portion with a plane bottom face and a flange extending downwardly from said face along the longitudinal axis of said portion, a plurality of reinforcing webs extending transversely from said flange at longitudinally displaced points therealong and at the ends thereof displaced slightly from said sides, said webs having notches adjacent to the bottom face of said upper portion, and a sheath of softer plastic material than said body encompassing said flange and said reinforcing webs and having an external contour complemental to the outer surface of said upper portion to provide a comfortable hand-hold for the luggage handle, said sheath having a fillet extending inwardly of the top of the opposite longitudinal walls thereof for resiliently engaging within said notches.

5. A device as set forth in claim 4 wherein said sheath is of substantially semi-circular transverse cross-section diminishing in size from the center towards the ends with the end walls being planar and disposed adjacent to the inner walls of the sides of said handle.

6. A luggage handle comprising an integral body of hard molded plastic material having a pair of sides and a top bridging member extending therebetween, said member comprising a solid rounded upper portion and a flange extending downwardly and medially below the longitudinal axis of said portion, a bead extending transversely from both sides of said flange along the free edge thereof, a plurality of reinforcing webs extending transversely from said flange at longitudinally displaced points therealong, said webs having notches therein remote from said bead, a sheath of softer plastic material than said body embracing said flange and the edges of said webs and having an external contour complemental to the outer surface of said upper portion to provide a comfortable hand-hold for the luggage handle, said sheath having fillets extending inwardly of the longitudinal walls at the top thereof for resiliently engaging within said notches, and a plurality of stabilizing ribs on the inner wall of said sheath between said webs and extending adjacent to the opposite edges of said bead.

References Cited in the file of this patent

UNITED STATES PATENTS

| | | |
|---|---|---|
| 1,008,604 | Lake | Nov. 14, 1911 |
| 2,595,724 | Stein | May 6, 1952 |
| 2,654,115 | Kafer | Oct. 6, 1953 |
| 2,673,630 | Axtell | Mar. 30, 1954 |
| 2,781,878 | Finkelstein | Feb. 19, 1957 |